March 7, 1939.　　O. E. FRUNK ET AL　　2,149,519

GRINDING MACHINE

Filed Nov. 2, 1937　　2 Sheets-Sheet 1

O. E. Frunk
H. G. H. Akerlind
INVENTORS

By: Glascock Downing & Seebold
Attys.

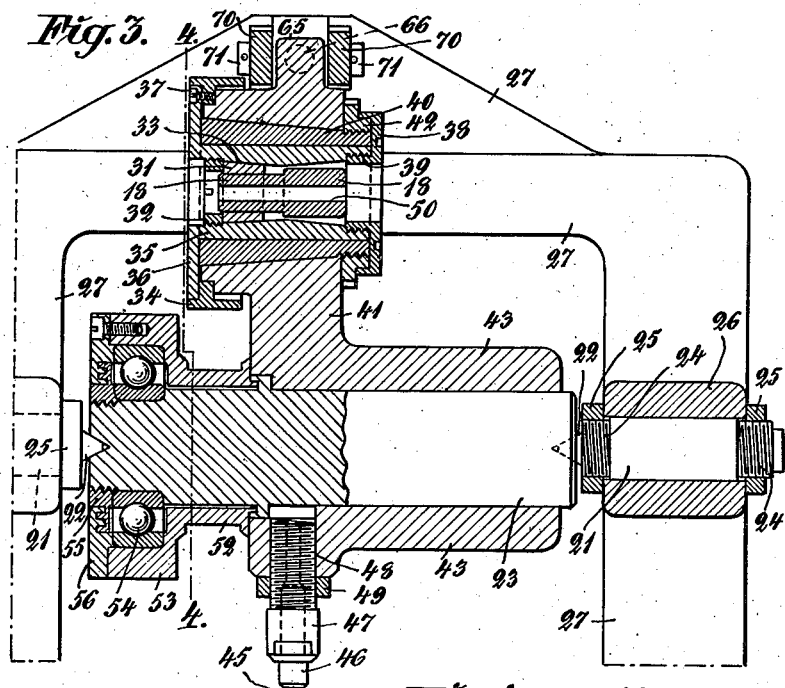
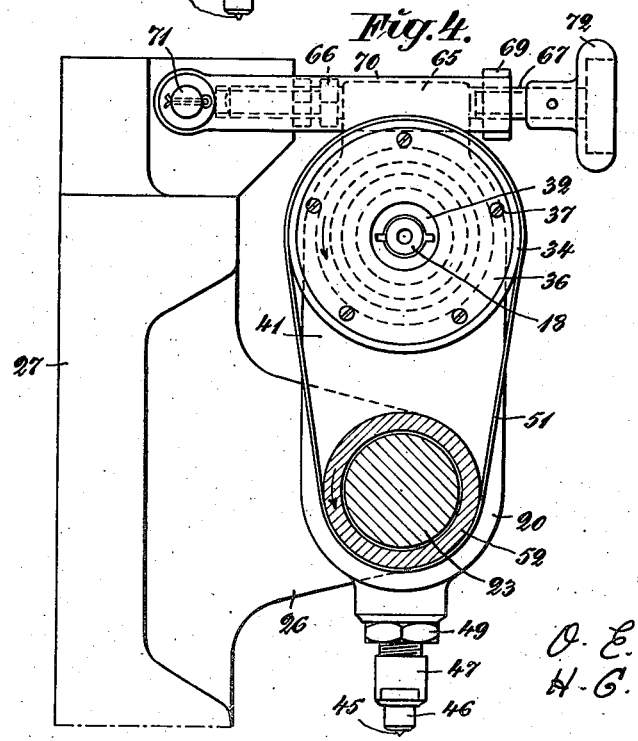

Patented Mar. 7, 1939

2,149,519

UNITED STATES PATENT OFFICE 2,149,519

GRINDING MACHINE

Otto Emanuel Frunk, Stockholm, and Hilmer Gustav Adolf Åkerlind, Essingen, Sweden, assignors to Aktiebolaget Linham, Stockholm, Sweden, a company of Sweden Application November 2, 1937, Serial No. 172,489
In Sweden November 9, 1936

3 Claims. (Cl. 51—95)

The present invention relates to grinding machines and more particularly to such grinding machines for grinding internal surfaces in which a rotatable grinding tool and a rotatable work holder are movable in respect to each other in the direction of the axis of the grinding tool. In such machines it is often necessary to interrupt the grinding operation for purposes of inspection or checking the dimensions of the work or for adjusting the grinding tool. For these purposes it is known to arrange the holder for the grinding tool or for the work respectively swingable in such a manner about an axis positioned excentrically of the grinding tool that the grinding tool or the work respectively can be moved away from working position and be restored thereto again after completed adjustment or inspection by being swung about said axis. However, in order that it shall be possible readily to continue the grinding operation after such a shifting of the parts without detriment to precision, the grinding tool or work respectively should be restorable without time wasting adjustments to exactly the same position as it occupied before removal, and the arrangement should preferably be such that sufficient accuracy is obtained merely by setting the respectve holder against a fixed rest. In previously known grinding machines of said type it has been difficult by simple means to effect such a shifting with sufficient precision, particularly when the requirements as to accurate dimensions are very great.

According to the present invention said difficulties are avoided by arranging the swinging axis of the work or of the grinding tool respectively approximately in a plane passing through the axis of rotation of the work and of the grinding tool. Said arrangement involves the advantage that the relative movement between the working surface of the grinding tool and the ground surface of the work during the last part of the swinging movement back to working position will take place approximately along the common tangential plane of said surfaces. Consequently, such light variations in the position of the work or of the grinding tool after restoring to working position as may occur for instance because of variations in the force with which the holder is pressed against the rest or on account of the presence of dust or the like between the holder and the rest, will not appreciably influence the relative position in the direction perpendicular to said tangential plane in which the transverse feed between the grinding tool and the work essentially takes place.

The invention will now be described more in detail having reference to the drawings attached to this specification and forming part thereof, which drawings show as an example an embodiment of a grinding machine according to the invention for grinding a cylindrical internal surface. In said drawings Figure 1 is a plan view of the grinding machine;

Figure 3 shows the work holder in a section through the bearing axis of the holder;

Figure 4 is a section on the line 4—4 in Figure 3.

Figure 1:
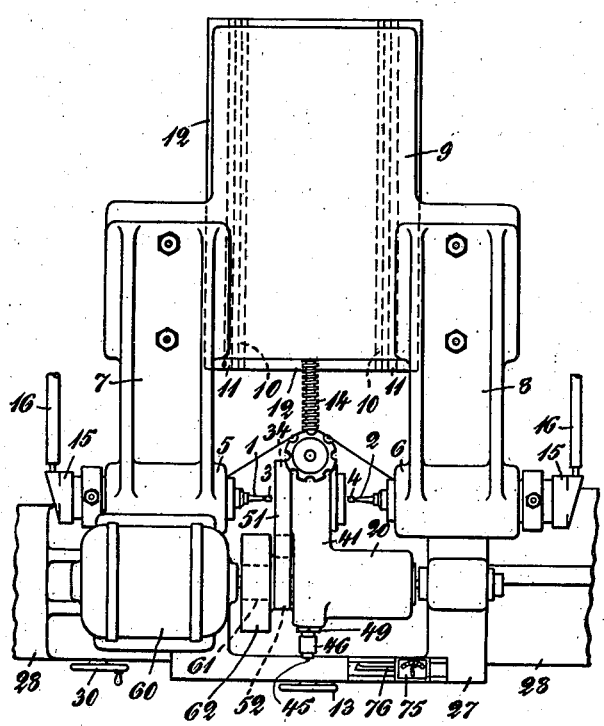

The machine illustrated in the drawings is provided with two rotatable and coaxial grinding spindles 1 and 2. Each spindle carries at one end a grinding wheel 3 or 4 respectively and is journalled at its other end in a bearing 5 or 6 respectively. Through the intermedium of brackets 7 and 8 the bearings 5 and 6 are rigidly connected with a common adjustable and lockable slide 9 which is guided in known manner by means of guides 10 engaging in slots 11 in a stationary table 12. A feed screw 14 provided with a hand wheel 13 serves to move the slide 9 to set the same in positions suitable for the grinding. Each grinding spindle is adapted to be driven individually by a motor, for example by a turbine 15 to which compressed air or other driving medium is supplied through a conduit 16. It is of importance to arrange the transmission of power to the grinding spindles so as to relieve the spindles of transverse stresses.

The work, which according to the shown example consists of a sleeve-shaped body 18, Figure 3, the internal cylindrical surface of which is to be ground, is supported in a projecting part of a holder, which in Figure 1 is generally designated with the reference numeral 20. The holder is swingably supported between two coaxial centres 21 provided with conical bearing points 22 engaging in corresponding conical recesses in the end surfaces of a cylindrical portion 23 of the holder. The centres 21 are at their ends formed with screw threads 24 and are provided with appertaining lock nuts 25 by means of which the centres can be rigidly locked in mandrel stocks 26 forming integral parts of a frame 27. The frame 27 is supported on a table 28, Figure 1, mounted in known manner on a slide, not shown, which is movable in guides so as to be able to perform a reciprocating movement in a direction parallel with the axis of the grinding spindles 1 and 2, the table 28 being pivoted on said slide so that it can be turned about a vertical axis for the purpose of setting the axis of rotation of the work in different angular positions with respect to the grinding spindles. When grinding cylindrical surfaces the table 28 is locked on the slide in such a position that the bearing axis of the holder 20 is parallel with the slide movement. The slide for supporting the table 28 normally derives its reciprocating movement from a motor-driven shaft but it can also be moved by hand by means of a hand wheel 30. As will be clear from the preceding description the arrangement is such that the slide 9 and the frame 27 are movable in mutually parallel planes.

The work 18, Figure 3, is by means of a conical sleeve 31 embracing the same and an annular screw 32 which bears against the end surface of the sleeve clamped in position in a conical recess 33 in a rotatable member 35 which is provided at one end with a pulley 34. The pulley 34 is secured by means of screws 37 to an annular flange 36 on the member 35. At the other end of the rotatable member 35 a shoulder ring 38 is rigidly secured by means of screw threads 39 to the member 35 and rotatable therewith. The bearing surface proper for the rotatable member consists of a cylindrical internal surface of a bearing sleeve 40 having a tapering external surface. The bearing sleeve is rigidly clamped in a correspondingly shaped tapering recess in an arm-like portion 41 of the holder 20. The means for clamping the bearing sleeve in position consist of a ring 42 threaded onto that end of the sleeve 40 which has the smallest external diameter, said ring engaging the external surface of the arm 41. The arm 41 for supporting the work 18 is made integral with a hollow body 43 which rigidly embraces the core 23 of the holder.

In the plane defined by the bearing axis of the holder and the centre axis of the work an adjusting tool in the form of a grinding diamond 45 is secured in a rod-shaped body 46 which in turn is adjustably disposed in a sleeve-shaped holder 47 provided with external screw threads. The holder is adapted to be screwed into a screw-threaded bore 48 in the hollow body 43. A nut 49 serves to lock the holder 47 in adjusted position. The grinding diamond 45 and the work are so positioned in the holder 20 that the distance between the diamond and the nearest side 50 of the cylindrical internal surface of the work 18 becomes divided into halves by the bearing axis of the holder 20 extending through the bearing points 22. The axis of rotation of the grinding wheels 1 and 2 are positioned in the same plane as the axis of rotation of the work and the bearing axis of the holder 20, and the grinding wheels engage the work along the line of intersection between said plane and the side 50 of the cylinder positioned nearest to the bearing axis of the holder.

Figure 2:
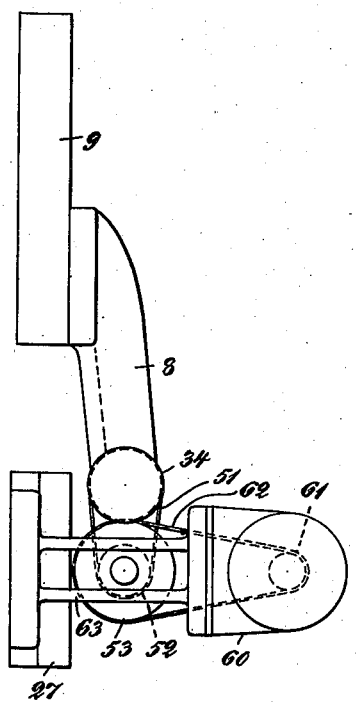
Figure 2 is a schematic side view of the machine with the bearing arrangement for one of the grinding spindles removed.

During the grinding operation the work is made to perform a rotational movement about its axis by means of a belt 51, Figure 1, passing over the pulley 34 and a pulley 52 which is rotatable about the core 23, Figure 3. Said latter pulley is made in one piece with a pulley 53 having a larger diameter, said pulley being journalled on the core 23 by means of a ball bearing 54. Shoulder rings 55 and 56 are provided in ordinary manner for holding the ball bearing and the pulley in correct axial positions. The pulley 53 is driven by an electric motor 60, Figures 1 and 2, by means of the motor pulley 61 and a belt 62 passing over the former and the pulley 53. The motor 60 is mounted on a pedestal 63 rigidly connected with the slide 27. The motor, the mandrel stocks 26 and the work holder 20 are supported by the table 28 and thus move together during the grinding operation. The work is then brought alternately into engagement with the grinding wheels 3 and 4. The path of movement of the frame 27 is preferably determined so that overlapping zones of the internal cylindrical surface of the work are ground alternately by the grinding wheels 3 and 4. Each end zone of the surface is being worked only by means of one of the grinding wheels.

For the purpose of locking the holder 20 in correct angular position during the grinding operation, the arm 41 of the holder is provided at its outer end with a nose 65, Figures 3 and 4, which is adapted to be clamped between an adjustable rest 66 and a screw 67, the rest consisting of a bolt which is screwed into the frame 27 and provided with a lock nut. The screw 67 is screwable in a yoke 69 which by means of two links 70 is connected with the frame 27, said links being swingable on pivots 71 secured in the frame, Figure 3. The locking screw 67, Figure 4, is provided with a knob 72. After loosening said screw, the yoke together with the links can be swung outwards out of engagement with the nose 65, whereafter the holder 20, provided that it takes up the position intermediate the two grinding spindles 1 and 2 shown in Figure 1, can be swung upwards away from its grinding position, clockwise according to Figure 4. The frame 27 is so arranged that the holder can be swung through a certain angle to a position determined by a stop or the like. In the embodiment shown the holder can be swung through an angle of 180°, enabling the diamond to be brought into engagement with the grinding wheels for sharpening and adjusting the working surfaces of the wheels. The slide 9 is then locked in a position suitable for effecting the grinding off of the wheels, the distance of the grinding diamond from the bearing axis of the holder 20 is adjusted, and the slide supporting the frame 27 is made to perform a reciprocating movement. The grinding diamond 45 is then moved in parallel with the axial direction of the grinding spindles successively over the working surfaces of the two grinding wheels, so that said surfaces are ground off to complete coincidence. Thus the same slide and the same path of movement are used as for the work, and the grinding diamond 45 constitutes an adjusting tool which is common to both grinding wheels. During said operation the arm 41 of the holder 20 bears against the front portion of the frame 27. In said position of the holder possibility is offered of inspecting and checking the ground surfaces of the work 18, a measuring device 75 being used for that purpose, for example. Said device, which comprises a finger 76, is arranged to be moved on a bracket of the frame 27 in the direction of the axis of the work. When moving the finger 76 over the ground surface of the work the deviations of the surface from cylindrical shape can be determined by means of a pointer.

Because the holder 20 is swingable the work can readily be removed from grinding position, for instance for inspection, and be restored to said position for continued grinding. If, furthermore, the bearing surfaces are made conical, as in the embodiment described where the holder is swingable about two coaxial conical centres, and if the bearing axis of the holder is arranged in the plane which passes through the axis of rotation of the grinding wheels and is parallel with the direction of feed of said wheels, grindings can be made with an exceedingly great precision, for example with an allowance of ¹⁄₁₀₀₀ millimeter, it being possible to interrupt the grinding of the surface at any time for effecting measurements of control and to resume immediately thereafter the work on the same surface. Through the positioning of the bearing axis of the holder 20 in the manner set forth the advantage is gained that the plane tangential to the surface elements of the cylindrical surface of the work 18 worked upon by the grinding wheels will form an angle of 90° with the plane through the centre axis of the work and the bearing axis of the holder 20, so that inaccuracies which may result in that the arm 41 after restoring to its working position will come to lie somewhat higher or lower than before, do not cause any appreciable change in the diameter of the ground cylinder when thereafter the work is put in motion in the axial direction. It is thus not necessary, when loosening and tightening the locking screw 72 during the grinding operation to take care that the pressure on the nose 65 will always be the same or that the surfaces contacting with each other upon locking are absolutely clean. Thanks to the centre bearings 22 the holder 20 can be journalled without play, since said bearing can be tightened relatively hard and can be readily afteradjusted.

The grinding machine according to the invention can be modified in many different ways. For example, the advantage obtainable by means of the swingable work holder 20 can also be obtained by arranging the grinding tool or grinding tools respectively swingable about an axis positioned excentrically in respect to the grinding tools in such a manner that the grinding tool or grinding tools respectively can be moved to and from working position by being swung about said axis while the holder for the work is fixedly or lockably connected with the frame 27. In this case the adjusting tool adapted for sharpening the working surfaces of the grinding tools can be arranged on the work holder or be arranged in such a manner that in position outside the working position the grinding tools can be brought into engagement with the adjusting tool for the purpose of adjusting and sharpening the working surface thereof. In a machine according to the invention the relative movement between the work holder and the grinding tool axially of the latter can also be obtained by giving to the grinding tool a reciprocating sliding movement in the axial direction of the tool while the frame 27 or the holder 20 is adapted to be displaced in a direction perpendicular to said movement.

We claim:—

1. A grinding machine comprising, a grinding tool support, two longitudinally spaced grinding tool spindles rotatably mounted on said support, a work support, a work carrier mounted on said work support and swingable about an axis parallel with the tool spindle axis so as to allow the work being swung into and out of operating position between the grinding tools, a work holder rotatably mounted on said work carrier, means for reciprocating said tool support and work support one relative to the other longitudinally of the tool spindle axis, means for feeding said tool support and work support one relative to the other transversely of the tool spindles in a plane through the tool spindle axis and the swinging axis of the work carrier, and means provided on the work support for holding the work carrier during the grinding operation in an angular position coinciding with said transverse feeding plane.

2. A grinding machine comprising, a grinding tool support, two longitudinally spaced grinding tool spindles rotatably mounted on said support, a work support, a work carrier mounted on said work support and swingable about an axis parallel with the tool spindle axis so as to allow the work being swung into and out of operating position between the grinding tools, a work holder rotatably mounted on said work carrier, means for reciprocating said tool support and work support one relative to the other longitudinally of the tool spindle axis, means for feeding said tool support and work support one relative to the other transversely of the tool spindles in a plane through the tool spindle axis and the swinging axis of the work carrier, means provided on the work support for holding the work carrier during the grinding operation in an angular position coinciding with the transverse feeding plane, and means for rotating said work holder adapted to remain intact upon swinging the work holder into and out of operating position and comprising a driving member co-axial with the swinging axis of the work carrier.

3. A grinding machine comprising, a grinding tool support, two longitudinally spaced grinding tool spindles rotatably mounted on said support, a work support, a work carrier mounted on said work support and swingable about an axis parallel with the tool spindle axis so as to allow the work being swung into and out of operating position between the grinding tools, a work holder rotatably mounted on said work carrier, means for reciprocating said tool support and work support one relative to the other longitudinally of the tool spindle axis, means for feeding said tool support and work support one relative to the other transversely of the tool spindles in a plane through the tool spindle axis and the swinging axis of the work carrier, means provided on the work support for holding the work carrier during the grinding operation in an angular position coinciding with said transverse feeding plane, means for rotating said work holder adapted to remain intact upon swinging the work holder into and out of operating position and comprising a driving member coaxial with the swinging axis of the work carrier, and a dressing tool mounted on said work carrier and angularly displaced relatively to the work holder so as to be moved into operative position by the work holder being swung out of operative position.

OTTO EMANUEL FRUNK.
HILMER GUSTAV ADOLF ÅKERLIND.